R. A. ILG.
AIR WASHER AND HUMIDIFIER.
APPLICATION FILED NOV. 17, 1916.
1,309,737.
Patented July 15, 1919.
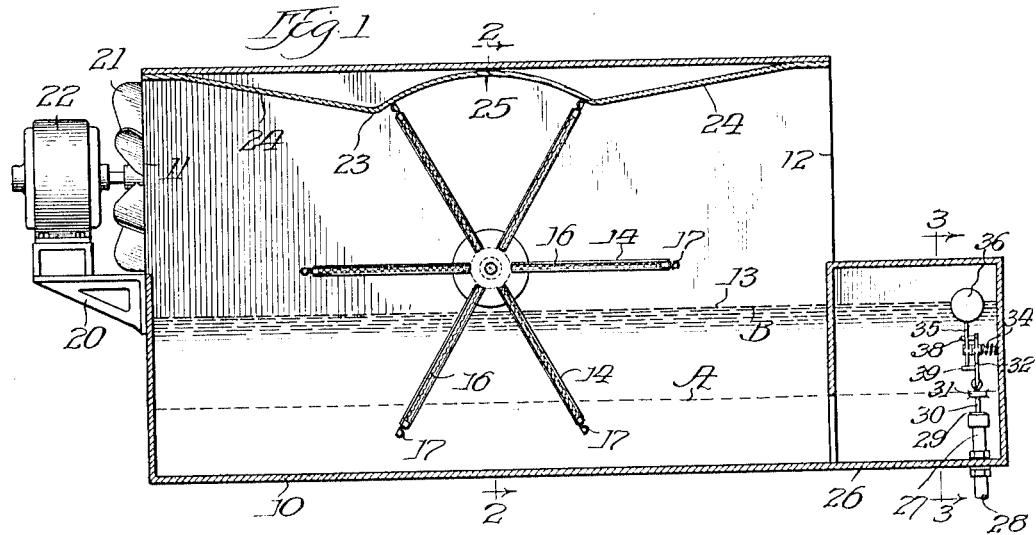
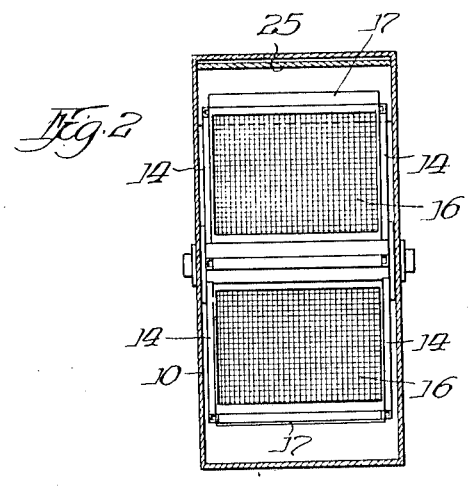
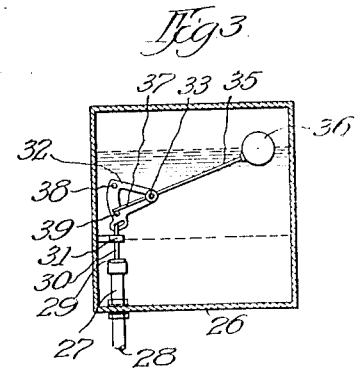
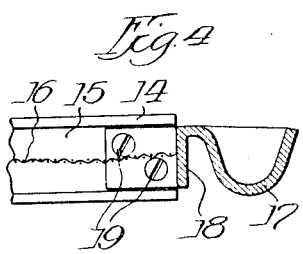
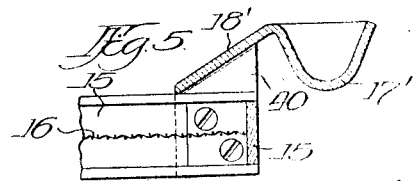
Witness:
Inventor
Robert A. Ilg.
By Pond & Wilson
Attys.

UNITED STATES PATENT OFFICE.

ROBERT A. ILG, OF CHICAGO, ILLINOIS.

AIR WASHER AND HUMIDIFIER.

1,309,737.  Specification of Letters Patent.  Patented July 15, 1919.

Application filed November 17, 1916. Serial No. 131,836.

*To all whom it may concern:*

Be it known that I, ROBERT A. ILG, a citizen of the United States, residing at Chicago, in the county of Cook and State of Illinois, have invented certain new and useful Improvements in Air Washers and Humidifiers, of which the following is a specification.

This invention relates to apparatus for purifying and moistening air, and has reference more particularly to that class or type of air washers and humidifiers which employs a tank to contain a body of water, a rotary screen dipping into the water, and a fan or other air-forcing device for creating a current of air through the tank above the body of liquid therein, the air current passing through the blades of the screen, slowly rotating the latter, and picking up and absorbing the moisture that adheres to the blades.

The principal and general object of the present invention is to improve the efficiency and effectiveness of devices of this character. Other and more specific objects are, to provide a construction which shall insure the washing and moistening of the entire body of air passing through the apparatus, to provide a construction which shall enable the blades of the rotary screen to be readily cleaned, thus rendering the device more efficient and sanitary, and to provide a construction wherein the volume of water through which the air passes may be increased over that which adheres to the blades from passing through the body of water.

Minor objects and advantages of the invention will be apparent to those skilled in the art from a consideration of the following description, taken in connection with the accompanying drawings, which illustrate a practical embodiment of the invention, and in which,—

Figure 1 is a vertical longitudinal section of the device;

Fig. 2 is a transverse section on the line 2—2 of Fig. 1;

Fig. 3 is a transverse section on the line 3—3 of Fig. 1;

Fig. 4 is an enlarged fragmentary detail view in section through the outer end of one of the blades of the rotary screen, more particularly illustrating the water-lifting trough or scoop carried by the blade; and Fig. 5 is a view similar to Fig. 4, showing a modification.

Referring to the drawings, 10 indicates as an entirety a rectangular box or tank, preferably of sheet-metal, that is open throughout substantially the upper half of its ends, as indicated at 11 and 12. The portion of the tank below the openings is designed to contain a body of liquid, preferably water, indicated at 13. Journaled in and between the side walls of the tank is a paddle wheel which includes a series of radial blades or paddles carrying screens. Each paddle or blade comprises, preferably and as herein shown, a pair of inwardly-facing channel-shaped arms 14 secured to the hub or shaft of the wheel, and a screen comprising a suitable frame 15 and a sheet of wire cloth or other screen material 16. The screen-frame 15 slidably engages the parallel arms 14 of the blade or paddle under sufficient friction to retain it in place when in use, but permitting the screen-frame to be readily withdrawn when required to be cleaned. Mounted on and extending the full width of each blade, at the outer end thereof, is a trough-shaped scoop 17, which, as shown in Fig. 4, may be bent to shape from a strip of sheet-metal, and the shank 18 of which may serve to connect the outer ends of the side members of the screen-frame 15 and form the outer transverse member of said frame, for which purpose the ends of the shank 18 are bent inwardly and secured to the frame members 15 by screws 19. On a bracket 20 secured to one end wall of the tank, and directly opposite the opening 11, is mounted an air-forcing device, herein shown as a fan 21 driven by an electric motor 22, whereby a current of air is forced through the upper portion of the tank between the openings 11 and 12. In order to insure that the entire body or current of air passing through the tank shall also pass through the blades of the screen, I provide an air guide, in the form of a sheet-metal plate 23, that is pressed into the general form indicated in Fig. 1 and is secured to the under side of the top wall of the tank. This air guide includes inwardly and outwardly sloping end portions 24 and an intermediate concave portion 25 that is concentric with the axis of the paddle wheel. As the paddle wheel revolves under the pressure of the air current against its uppermost blades, the outer edge of at least one of the blades is always in contact with the concave surface 25; the contact in the construction illustrated being that of the outer edge of the trough-shaped scoop. This insures that all of the air shall pass through at least one of the screen blades, and prevents the escape of any portion of the air over the outer free edge of the blade.

As the paddle wheel revolves, the scoops 17 successively pick up some of the water, and as each blade approaches the vertical position, the water carried by the scoop thereof falls down and is distributed over the screen, thereby increasing the volume of water through which the air passes over that which merely adheres to the screen when passing through the water, whereby a more effective washing and moistening of the air is secured.

For use in situations where a supply of water under pressure is conveniently available, I have provided an additional optional improvement, consisting of a device by which the supply of water in the tank may be automatically replenished when the water has fallen to a predetermined level. This device may consist of any convenient form of flushing tank and trip valve. As herein shown, 26 designates a flushing box or tank that may be secured to one end of the main tank 10, and receives the delivery nozzle 27 of a supply pipe 28 that is connected to any source of water under pressure. The delivery of water through the nozzle 27 is controlled by a valve 29, the stem 30 of which slides through a guide 31 and is loosely connected to a swinging segment 32 mounted on a pivot pin 33 that projects inwardly from one of the vertical walls of the box 26. This segment 32 is frictionally held against swinging downwardly by gravity or upwardly by reason of the water pressure on the valve 29 by means of a spring 34 surrounding the pin 33 and frictionally engaging the hub of the segment 32. Pivoted on the inner end of the pivot pin 33 is a lever comprising a long arm 35 carrying at its free end a float 36, and a short arm 37, the free end of which is adapted to alternately engage stop pins 38 and 39 carried by the segment 32.

In the operation of a device equipped with the described automatic water-supply apparatus, when the level of the water in the tank 10 falls to the point indicated by the line A, the float 36 has fallen to a point where its gravity is effective, through the lever 35, 37, to exert a lifting effect on the pin 38, thereby raising and opening the valve 29. The water thereupon flows in until the level B (Fig. 1) is reached, at which point the short arm 37 of the lever engages the pin 39, and forces the valve 29 to closed position, thereby shutting off the inflow of water. Where the automatic water-supply device is not used, the body of water in the tank 10 will, of course, be replenished by hand as often as required.

An alternative to the construction and arrangement of the water pick-up or scoop already described is shown in Fig. 5, wherein the scoop 17′ has a shank 18′ formed with downwardly turned ends 40 that are secured to the outer ends of the parallel carrying arms 14 of the blades; the shank 18′ thus becoming the outer transverse member of the screen-carrying frame. By elevating the scoop 17′ above the plane of the arms 14, the screens themselves may be readily withdrawn without withdrawing the scoops or necessitating the preliminary removal of the latter.

It is believed that the manner in which the described apparatus effectuates the stated purposes and objects of the invention will be readily understood by those skilled in the art without further detailed description; and hence, reserving to myself such variations and modifications as fairly fall within the scope and principle of the invention,—

I claim:

1. In an air washer and humidifier, the combination of a tank to contain a liquid, said tank being open at the upper portion of both end walls thereof, a paddle wheel having radial screen paddle blades rotatably mounted in and transversely of the tank and dipping into the liquid contained in the latter, an air-forcing device positioned opposite one open end of said tank, and an air guide slidably engaged continuously by the outer transverse edge of one or more of the blades as the paddle wheel rotates, whereby to cause all of the air delivered by said air forcing device to pass through said blades and turn said paddle wheel.

2. In an air washer and humidifier, the combination of a tank to contain a liquid, said tank being open at the upper portion of both end walls thereof, a paddle wheel having radial screen paddle blades rotatably mounted in and transversely of the tank and dipping into the liquid contained in the latter, an air-forcing device positioned opposite one open end of said tank, and an air guide on the under side of the top wall of said tank formed with a concave lower surface coincident with the arc of a circle whose center lies in the axis of said paddle wheel, said concave surface being slidably engaged continuously by the outer transverse edge of one or more blades of the paddle wheel, whereby all of the air delivered by said air forcing device is caused to pass through said blades.

3. In an air washer and humidifier, the combination of a tank to contain a liquid in its lower portion, means to force a current of air through the upper portion of said tank, and a paddle wheel rotatably mounted in and transversely of said tank, each of the blades of said paddle wheel comprising a pair of parallel arms and a removable screen slidably engaging and supported by said arms.

4. In an air washer and humidifier, the combination of a tank to contain a liquid in its lower portion, means to force a current of air through the upper portion of said tank, and a screen paddle wheel rotatably mounted in and transversely of the tank, each blade of said paddle wheel being provided at its outer end with means adapted to pick up some of the liquid and later distribute it over the screen surface of the blade as the latter approaches a vertical position.

5. In an air washer and humidifier, the combination of a tank to contain a liquid in its lower portion, means to force a current of air through the upper portion of said tank, and a screen paddle wheel rotatably mounted in and transversely of the tank, each blade of said paddle wheel being provided at its outer transverse edge with a trough-shaped scoop extending the full width of the blade and adapted to pick up some of the liquid and later distribute it over the screen surface of the blade as the latter approaches a vertical position.

ROBERT A. ILG.